G. A. AND C. HEINEKE.
PROCESS FOR CLEANING FURS.
APPLICATION FILED AUG. 24, 1918.

1,317,130.

Patented Sept. 23, 1919.

UNITED STATES PATENT OFFICE.

GUSTAVE A. HEINEKE AND CARL HEINEKE, OF CHICAGO, ILLINOIS.

PROCESS FOR CLEANING FURS.

1,317,130. Specification of Letters Patent. Patented Sept. 23, 1919.

Original application filed May 24, 1918, Serial No. 236,399. Divided and this application filed August 24, 1918. Serial No. 251,316.

*To all whom it may concern:*

Be it known that we, GUSTAVE A. HEINEKE, a citizen of the United States, and CARL HEINEKE, a subject of the German Empire, both residing at Chicago, in the county of Cook and State of Illinois, have invented new and useful Improvements in Processes for Cleaning Furs, of which the following is a full, clear, and exact description.

Our invention relates to a new and useful process for cleaning fabrics, and particularly to the process for cleaning furs for which we applied for Letters Patent of the United States May 24, 1918, Serial No. 236,399, of which this application is a division. Heretofore furs and fur garments have been cleansed, particularly by furriers, by inclosing them in a rotatable drum in which a quantity of saw-dust impregnated with a cleansing ingredient had been placed, and after the drum had been revolved for a period of time, sufficient to clean the fur, removing the furs and garments and thoroughly agitating the same to remove and shake out the saw-dust and loose hairs from the same. Formerly the saw-dust and loose hairs were shaken out of the furs by hand, but more recently this has been done by placing the cleansed furs in a second rotatable drum having a foraminous periphery and revolving the same until the saw-dust and loose hairs were entirely removed from the furs and had gravitated to the bottom or lowest segment of the drum and then out of the same.

The object of our method is to use but one drum to both clean the furs; to beat the furs within the drum and thereby remove the saw-dust or its equivalent and polish the same; to avoid the loss of time and labor heretofore necessary to remove the furs from the cleansing drum to the means employed to remove the saw-dust, and to prevent the floating dirt and loose hair generated by the process from being projected into the open air. These and other objects we accomplish in the manner and by the method hereinafter fully disclosed.

Figure 1:
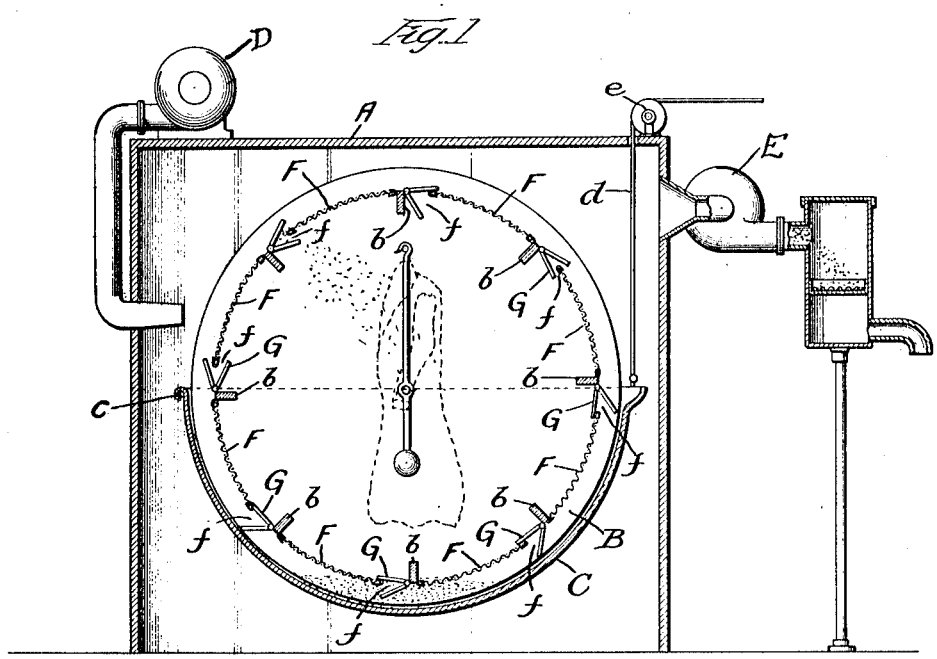
Figure 1 is a vertical transverse section of the apparatus employed by us in operating our improved method and illustrates the first step thereof.
Figure 2:
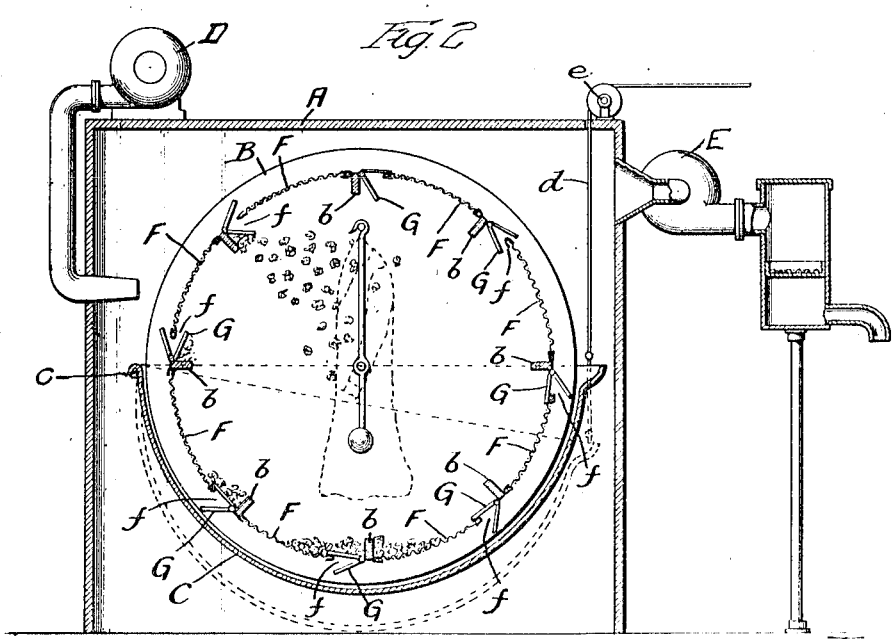
Fig. 2 is a similar view illustrating the second step.

The apparatus illustrated in the drawing constitutes the subject-matter of a co-pending application for Letters Patent of the United States, filed May 24, 1918, Serial No. 236,400 and consists, principally, of a cabinet A; a drum B therein rotatable about a transverse axis; a hopper C in which the lower half of the drum is adapted to revolve and which is capable of being raised and lowered; a blower-fan D for injecting a current of air into the cabinet at one end thereof, and an exhaust-fan E for exhausting the air at the other end. These parts of the apparatus are more fully described and illustrated in the aforesaid co-pending application to which reference is had for a more specific description thereof.

For the purposes of this application, however, attention is directed more fully to the construction of the drum and the hopper. The hopper is shown to consist of a trough-shaped receptacle having a semi-circular bottom and supported by having its rear end pivotally connected to a transverse shaft $c$ and its front end suspended by a cable $d$, which latter extends vertically up therefrom through the top of the cabinet and over a suitable sheave $e$ and from thence to a point within convenient reach of the operator.

The drum is journaled concentric to the center from which the curvature of the semi-circular bottom of the hopper is struck when the latter is in its uppermost position. Its radius and width are less than that of the hopper in which the lower half of it revolves. Near its circumference the sides of the drum are connected by a series of equidistant bars $b$, $b$, and between these bars rectangular screens F, F, are placed that are of such dimensions that they fill in the space between the sides of the drum, and when one end of each screen is secured to, say, the left hand side of the adjacent bars the other end will fall short of and be separated from the bar on the left thereof a sufficient distance to leave a transversely elongated opening $f$. These openings $f$ are designed to be opened and closed by butterfly scoops G, the wings of which are disposed at, say, eighty (80) degrees to each other, and are hinged or otherwise suitably pivoted at their angles to the right hand sides of the bars. The wings of these scoops project a distance slightly greater than the width of opening $f$ and are so disposed that one wing of each scoop will be within the circle intersecting the screens and the other outside of said circle.

The furs to be cleaned are inserted in the drum through a door which is closed by one of said screens, which latter has one side hinged to one side of the drum and its other side locked in any suitable manner to the opposite side of the drum. If the fur is made into a garment or adorns the same, the garment is hung by suitable means within the drum. A sufficient quantity of saw-dust impregnated with cleansing ingredients, such as gasolene or ammonia, is then poured into the hopper and the hopper is raised to its uppermost position and the drum rotated. The outer wings of these scoops dig into and scoop up a quantity of saw-dust as they travel through the hopper and carry the saw-dust up above the horizontal plane of the axis of the drum where the current of air from blower B blows the saw-dust in through openings $f$ against the furs or garments. At the same time the scoops when elevated to a point near the uppermost segment of the drum rock on their pivots and dump the remainder of the saw-dust retained by them after passing the current of air from the blower into the drum over the garments or furs. After this operation has continued for a sufficient length of time the cabinet and the screen door of the drum are opened and a quantity of sponges inserted into the drum. The hopper is then lowered until it is in a position where the scoops can no longer dip into and scoop up the saw-dust therefrom, whereupon the hinged door of the drum and the cabinet are closed and the drum is again rotated. During this second period of rotation of the drum the saw-dust will, to a great extent, be shaken out of the furs and will gravitate through the lowest segment of the foraminous perimeter of the drum back into the hopper, but considerable saw-dust will remain embedded in the furs. This embedded saw-dust is beaten out of the furs by the action of the sponges which are lifted by bars $b$, $b$, and thrown against the furs by the rotation of the drum and the current of air blown through the same, and they not only beat the saw-dust and loose hairs and dust out of the furs, but brush against and glaze the surface of the furs.

Instead of saw-dust fine white sand can be used in our improved process, or better still, a mixture of silica and saw-dust. The sand will not absorb the cleansing material, the grains thereof merely retain a film of the same on their surfaces, but they penetrate farther into the fur and loosen up the hair more thoroughly so that the saw-dust can be driven deeper into the fur. When sand is used it not only cleanses the fur, but, if there is cloth used in the exterior of the garment, it both cleanses and roughens up the nap of the same and thus removes the shiny places and makes the cloth look like new.

The saw-dust used in our improved method becomes very dirty and has to be changed very frequently, but the sponges last a very long while and gradually absorb an amount of the cleansing ingredients and their exteriors become smooth and rounded, and when in this condition they perform their functions in a better manner than when new. After the furs have thus been relieved of the saw-dust and glazed, the rotation of the drum is stopped and the furs and sponges removed, and the apparatus is then ready to clean another batch of furs.

If desired, the sponges may be left in the drum all the time and thus greatly assist the saw-dust in cleansing the furs by beating them and loosening up the hair thereof so as to enable the saw-dust to get into the fur better. This modified method is the preferred method, because the work of cleansing is accomplished in a much quicker time. All that the operator has to do when he considers that the furs have been treated by the action of the saw-rust a sufficient length of time, is to lower the hopper by manipulating cables $d$ and stopping the further rotation of the drum.

What we claim as new is:—

1. A method of cleaning furs consisting in agitating the same in a suitable receptacle having a foraminous bottom, first with cleansing material and then with sponges alone.

2. A method of cleaning furs consisting in agitating the same in a rotatable drum having a foraminous periphery, first with saw-dust impregnated with cleansing material, and, second with sponges.

3. A method of cleaning furs consisting of agitating the same in a suitable receptacle having a foraminous bottom first with a cleansing material and then with sponges alone through which a current of air is blown.

4. A method of cleaning furs consisting in agitating the same in a rotatable drum having a foraminous periphery, first, with saw-dust impregnated with cleansing material, and, second, with sponges while a current of air is blown therethrough.

5. A method of cleaning furs consisting of agitating the same in a rotatable drum having a foraminous periphery with sawdust and sand impregnated with cleansing material, and sponges while a current of air is blown therethrough.

6. A method of cleaning furs consisting in agitating the same in a rotatable drum having a foraminous periphery, first, with sawdust and sand impregnated with cleansing material, and, second, with sponges while a current of air is blown therethrough.

In witness whereof we have hereunto set our hands this 19th day of August, 1918.

GUSTAVE A. HEINEKE.
CARL HEINEKE.

Witnesses:
FRANK D. THOMASON,
FLORENCE MITCHELL.